Patented Apr. 3, 1934

1,953,567

UNITED STATES PATENT OFFICE 1,953,567

LEAVENING PROCESS

Joseph S. Reichert and William J. Sparks, Niagara Falls, N. Y.

No Drawing. Application February 7, 1933, Serial No. 655,680

7 Claims. (Cl. 99—10)

This invention relates to the production of baked raised products such as bread, cake, biscuits and the like, and more particularly to the baking of such products without the use of yeast or $CO_2$ evolving powders. Most specifically, the invention relates to the use of hydrogen peroxide to effect the raising of the products before and during baking.

In U. S. Patent 989,189 there is described a method of baking bread from high gluten flour in which it is stated peroxide can be satisfactorily used for that purpose. In this process the hydrogen peroxide is incorporated with the gluten dough and after the dough has been formed it is immediately made into separate loaves and placed directly in an oven and baked. It is not disclosed here, however, how to prepare bread from the ordinary white flour using hydrogen peroxide as a leavening agent; nor is there any disclosure as to the applicability of hydrogen peroxide as a substitute for baking powder in the preparation of cakes, biscuits and the like.

The object of this invention is to provide a method for utilizing hydrogen peroxide in the production of bread, cakes, biscuits and the like without the use of yeast or other $CO_2$ evolving materials by substituting as a leavening agent, hydrogen peroxide. We have discovered that the proper preparation of raised baking products utilizing hydrogen peroxide requires control of the amount of hydrogen peroxide added at the time of forming the dough; that the production of a satisfactory baked product requires careful control of the amount of peroxide permitted to remain undecomposed in the dough before the dough is baked, and a further control of the time of proofing of the dough so as to avoid harmful effects due to too long standing.

We have discovered that although the dough may have been allowed to stand outside the oven until full raising has taken place, nevertheless if more than a certain maximum amount of hydrogen peroxide is left undecomposed in the dough when the loaf is put into the oven, the baked products will come out of the oven, after the usual baking period, with a doughy unleavened texture and containing undecomposed peroxide. This we have found is due to the fact that the commonly occurring catalases of the flour lose their ability to decompose hydrogen peroxide in the dough after a certain temperature has been reached, and that therefore the hydrogen peroxide, even though heated to baking temperature thereafter, is stable in the baked product. Such amounts of hydrogen peroxide as will remain after the product is baked cause agglomeration in the center of the loaf, forming an entirely unleavened or heavy layer. A certain maximum of peroxide may be allowed to remain in the dough before baking, and we have found it advantageous to have a certain small percentage of the peroxide left undecomposed at the time the loaf is put into the oven. This amount is small; it should not exceed that amount which will be decomposed in the dough before the catalase destroying temperature is reached.

We have further discovered that if the dough is allowed to stand more than a certain time after all of the hydrogen peroxide in the dough has decomposed, smaller and smaller loaves will result the longer the standing, and that after this period the desirable characteristics as to crumb structure and appearance diminish and in time will disappear.

The actual amount of hydrogen peroxide to be added to the dough at the time of mixing will depend on the product being prepared, i. e. on the amount of raising actually desired. Thus, the amount of peroxide added can vary from a very small amount in the case of very slightly raised products to a maximum amount beyond which there is no increase in loaf size, with increased peroxide added.

This maximum amount of peroxide is practically determined by the limit of extensibility of the dough. That is, this maximum amount of peroxide when decomposed to release oxygen, will give just that amount of gas which can be held by the dough; if more peroxide were added, the limit of extensibility would be exceeded and the cells would burst rather than give any increase loaf size. This limit, of course, varies with various grades of flour, and must be controlled by tests made on the various lots of flour. This maximum amount is in general about 0.5% to 2.0% $H_2O_2$ based on the flour used. More peroxide than the necessary maximum is not only wasteful but may work harm. The proofing period is abnormally extended and may result in unfavorable modifications of the gluten or other flour constituents.

The proper amount of peroxide is first determined and this preferably added to the liquid, such as water, with which the dough is to be prepared. The usual dough ingredients are mixed together utilizing the peroxide containing liquid. After the dough has been formed it may be proofed for a while before forming into loaves, but preferably it should be formed into the desired shape shortly after completion of the dough preparation. The loaves thus prepared are allowed to stand and raise, due to the evolution of oxygen from the peroxide decomposing in the dough. The loaves are allowed to proof until the peroxide left is not more than about 0.08% of the weight of the flour in the dough, regardless of the starting $H_2O_2$ concentration. The time required to reach this peroxide concentration will now vary with the amount added at the start, activity of the flour and other catalysts and stabilizers.

The proper time at which to bake, i. e. the time at which the necessary $H_2O_2$ decomposition has been attained may be determined as follows: 20 grams of the dough is pulped in 50 cc. of 20% by volume aqueous solution of $H_2SO_4$; to this add 5 cc. of 6% aqueous solution of $HNO_3$ and 50 cc. water. This is warmed to 90° C. and titrated with standard sodium nitrite solution (e. g. 0.1786 N $NaNO_2$ solution). The end point of this titration may be ascertained by titrating in an electrometric apparatus or the slight color change to a pale reddish yellow.

When this titration test shows that a hydrogen peroxide concentration of not more than 0.08% by weight of the flour has been reached, the loaf may be baked, and the finished product will contain no undecomposed peroxide and will have enhanced characteristics as to evenness of structure, firmness of crumb, uniformity of texture, pleasing whiteness and taste, and other desirable characteristics. The dough, after having reached this point in the decomposition of the hydrogen peroxide therein, may be allowed to stand for a short while thereafter, but this should not be more than about two hours after the proper peroxide content has been reached.

We have found that loaves baked after the two-hour period will be smaller in size than if baked within the two-hour period. The texture will become less even; the walls of the individual gas cells within the loaf apparently break down so that they agglomerate to form larger cells, leading to an undesirable appearance in the cut loaf after baking. We have further found that the raised loaf after standing beyond the point at which complete decomposition of the peroxide has taken place, i. e. somewhere near the end of the two-hour period after the proper peroxide content has been reached, becomes very susceptible to shock. The handling of a pan, if it should occasion a slight jar, will cause the loaf to fall appreciably and result in the baked product having all the characteristics of a baking powder product which has "fallen". Up to the end of two hours after the proper peroxide concentration has been reached, this susceptibility to shock is not appreciable. This is due to the fact that at the start there is still peroxide in the loaf which is decomposing, and the individual gas cells in the loaf are still distended due to evolving gas from the peroxide. Finally, the cell walls themselves have become thin due to the tension placed on them and maintained, so that a slight shock causes their rupture and combination, and also causes a rupturing of outer walls and actual escape of gas to the surrounding atmosphere.

The time necessary for peroxide decomposition will vary considerably with variations in the catalytic activity of the different flour compositions. Also, the required time can be regulated by the control of the catalase activity of the mixture. Whole wheat flours are extremely active in peroxide decomposition by virtue of their high catalase content, and therefore require comparatively short proofing periods in order to insure the required decomposition of the peroxide. This catalase activity of the flours can be modified, for example, by heating before mixing so as to decrease the activity; or, a high catalase flour can be mixed with a low catalase flour to obtain intermediate activity. Aqueous extracts of, for example, whole wheat can also be used to augment the catallases already present.

Catalysts or stabilizers for the decomposition of $H_2O_2$ may be added to the dough batch to shorten or lengthen the time to secure the necessary decomposition. For this purpose we have found that the commonly used stabilizers for peroxide solutions can be used in the dough batch.

The following examples will illustrate some of the mixtures or methods to which our invention is applicable.

*Example I*

The dough was made by mixing the following ingredients in the usual manner:

| | |
|---|---|
| Flour | 350 grams |
| Lard | 20 grams |
| Salt | 4 grams |
| Milk | 285 grams |
| $H_2O_2$ | 15 cc. | of a 27.6% aqueous solution.

The dough was molded and put into baking pans and allowed to stand at room temperature until 94% of the hydrogen peroxide in the dough had decomposed. The hydrogen peroxide decomposed in the dough was determined by the titration of a control sample by the method above described. The time required to obtain the 94% decomposition was about two hours. The molded dough was then baked at 220° C. for 20 minutes. The baked product was found to be whiter and lighter than a corresponding bread made with baking powder. The volume-weight ratio was 3.7 cc. per gram of biscuit; a corresponding baking powder product had a volume weight ratio of about 3.0 cc. per gram. No residual peroxide could be detected in the baked product by the usual qualitative potassium iodide test method.

*Example II*

The same formula and time and temperature of baking were used as in Example I. Various molds of the dough were proofed for varying periods of time and then baked. Certain of the biscuits were dropped from a height of 6 inches onto a hard surface after proofing, just prior to baking. The results secured are given in the following table:

| Proofing time hours | % residual $H_2O_2$ in dough | KI test for $H_2O_2$ in baked product | Volume of product baked without dropping (cc./gm.) | Baked product | Volume of product baked after dropping 6'' (cc./gm.) |
|---|---|---|---|---|---|
| 1 | 0.23 | + | | Bad odor | 3.7 |
| 1.5 | 0.0837 | + | | | 3.7 |
| 1.75 | 0.4 | + | | | |
| 2.0 | 0.02 | − | 3.7 | Good product | 3.6 |
| 2.5 | | | 3.7 | ....do | 3.5 |
| 3.0 | | | 3.7 | ....do | 3.1* |
| 4.0 | | | 3.6 | | |
| 5.0 | | | | Larger cells | 2.8** |
| 6.0 | | | 3.3 | Yellowish color—larger cells | 2.7** |
| 12.0 | | | 3.0 | Coarse structure—still larger cells | |

*Good appearance.
**Structure compacted.

Example III

Graham muffins from Pillsbury's Best patent flour, and Sunnyfield graham flour.

| | |
|---|---|
| White flour | 1 cup |
| Salt | 1 teaspoonful |
| Graham flour | 1 cup |
| Sugar | ¼ cup |
| Butter | 3 tablespoonful |
| Eggs | 1 (beaten) |
| $H_2O_2$ | 15 cc. |
| of 27.6% solution. | |
| Milk | 1 cup |

The peroxide-milk solution was stirred into the mixture of dry ingredients to a medium dough. The egg was beaten into the dough and immediately placed in muffin tins and proofed until the peroxide was completely decomposed as shown by a test. The dough was then baked for 40 minutes at 350–400° F. An edible product, light in color, and free from the taste of baking powder residues was obtained.

Example IV

The same formula as given for Example I was used, except that 22.5 cc. of 27.6% of the aqueous $H_2O_2$ solution was used. The ingredients were mixed in the manner described, molded and then proofed until the quantity of undecomposed hydrogen peroxide in the dough was equivalent to 0.02% by weight of the flour. Using a high grade patent flour, this requires about two times as long a proofing period as for Example I.

The baked product was lighter than that obtained in Example I, having a volume-weight ratio of 4.4 cc. per gram of biscuit. No residual peroxide existed in the baked biscuit.

A mold of this dough, baked at the end of a two-hour proofing period, the proofing period of Example I, had a dark, unleavened doughy mass in the center of the biscuit, and tests showed a large amount of undecomposed peroxide.

The results of baking samples from this mix at the end of various proofing periods is shown in the following table:

| Proofing time hours | Peroxide in dough; % by weight of flour | Peroxide in baked product by KI test | Remarks |
|---|---|---|---|
| 1.5 | 0.29% | + | Doughy; odor bad. Structure poor. |
| 2.0 | 0.22% | + | |
| 2.25 | 0.19% | + | |
| 2.5 | 0.13 | + | |
| 2.75 | 0.085 | + | |
| 3.00 | 0.052 | + | |
| 3.25 | 0.038 | + | Slight odor; structure improved. |
| 3.5 | 0.021 | Faint | No objectionable odor; good structure. |
| 3.75 | ---------- | − | Do. |
| 4.0 | ---------- | − | Do. |

Example V

The same formula was used as in Example I, except that 30 cc. of 27.6% by weight of aqueous $H_2O_2$ solution was used; i. e. twice that used in Example I. The ingredients were mixed in the manner described above and the molded dough was proofed until it contained less than 0.015% $H_2O_2$ by weight of the flour. The baked product contained no undecomposed peroxide but the structure was poor and there was no improvement in the volume per gram of baked product, showing no value in the excess peroxide but actual harm due to long proofing and $H_2O_2$. The proofing time, using patent flour, was approximately double that of Example III, which had 50% more $H_2O_2$ than in Example I.

The data obtained is given in the following table:

| Proofing time hours | $H_2O_2$ in dough % by weight of flour | Undecomposed $H_2O_2$ in baked product | Remarks |
|---|---|---|---|
| 5 | 0.198 | + | Moist doughy center; bad odor. |
| 5¼ | 0.172 | + | |
| 5½ | 0.142 | + | |
| 6 | 0.128 | + | |
| 6¼ | 0.096 | + | |
| 6½ | 0.068 | + | Improved odor and structure. |
| 7 | 0.052 | + | Do. |
| 7¼ | 0.031 | + | Very little odor. |
| 7½ | ---------- | − | Edible bread but structure not equal to Example IV; volume about the same as Example IV. |

Example VI

Plain muffins, using Pillsbury's Best patent flour.

Formula:

| | |
|---|---|
| Flour | 350 grams |
| Milk | 285 cc. |
| $H_2O_2$ | 15 cc. of 27.6% |
| Butter | 20 grams |
| Sugar | 20 grams |
| Salt | 2 grams |
| Eggs | 1 (well beaten) |

Ingredients were mixed in the usual manner and proofed until the dough contained only a trace of undecomposed peroxide as shown by test. The dough was baked at 200° C. for 30 minutes and then 240° C. for 10 minutes. The baked product compares as follows with a product obtained by using 28 grams of a standard baking powder in place of the peroxide and baked 30 minutes at 200° C.:

| Leavening agent | $H_2O_2$ | Baking powder. |
|---|---|---|
| Volume (cc./gram) | 3.6 | 2.8. |
| Structure | Fine | Cells larger. |
| Color | White | Slightly yellow. |
| Taste | Good | Good. |

Example VII

Silver cake, using a commercial recipe.

Formula:

| | |
|---|---|
| Sugar | 220.0 grams |
| Butter | 100.8 grams |
| Pastry flour | 344.0 grams |
| Egg whites | 5. |
| Milk | 157.0 cc. |
| Vanilla | 10.0 cc. |
| $H_2O_2$ | 15.0 cc. |
| of 27.6% solution. | |
| Salt | 1.5 grams |

The ingredients were mixed in the usual manner and proofed until the peroxide was almost completely decomposed as shown by the above described test. The dough was then baked at 180° C. for 30 minutes. This cake had a volume of 3.0 cc. per gram. A commercial cake, leavened with baking powder, using the same formula had a coarser structure, a darker color and a volume of only 2.6 cc. per gram.

Example VIII

Leavening with urea peroxide.

Formula:

| | |
|---|---|
| Flour | 350 grams |
| Lard | 20 grams |
| Milk | 300 cc. |
| Salt | 4 grams |
| Urea peroxide | 13 grams |

The urea peroxide was dissolved in the milk and mixed with the dry ingredients in the manner described. The dough was then formed into biscuits and proofed until the peroxide was completely decomposed as shown by the test. The biscuits, baked at 200° C. for 25 minutes, were well leavened, having a white color and an even texture, and the volume weight ratio was 3.4 to 3.5 cc. per gram. Biscuits baked 15, 30 and 45 minutes prior to the time when properly proofed as indicated by the test, had a bad odor and moist, unleavened centers.

Example IX

Leavening with sodium percarbonate.

Formula:

| | |
|---|---|
| Flour | 520 grams |
| Salt | 6 grams |
| Lard | 30 grams |
| Milk | 450 cc. |
| Tartaric acid | 27 grams |
| Sodium percarbonate | 24 grams |

The finely ground tartaric acid was mixed with the flour, lard and salt. The milk containing sodium percarbonate in solution was then incorporated, and after weighing into pans, the dough was proofed until the equivalent of .04% hydrogen peroxide by weight of flour remained. After baking at 200° C. for 30 minutes, a product having good structure but a slightly yellowish appearance in spots was obtained. The volume-weight ratio was 3.0 cc. per gram.

Example X

Leavening with borax peroxide.

Formula:

| | |
|---|---|
| Flour | 350 grams |
| Salt | 4 grams |
| Lard | 20 grams |
| Milk | 300 cc. |
| Borax peroxide | 13 grams |

Borax peroxide is a product obtained by evaporating to dryness an aqueous solution of borax and hydrogen peroxide. The material used in this trial contained 16% of available oxygen.

The flour, salt, lard and borax peroxide were mixed and then formed into a medium dough by working in the liquid. Biscuits baked before the peroxide concentration in the dough, calculated as $H_2O_2$, had reached 0.087% by weight of flour were not of uniform structure and a slight odor was observed. Undecomposed $H_2O_2$ in the baked product was indicated by the KI test. When the peroxide concentration in the dough was 0.077 to 0.015% by weight of flour, a product of uniform texture and white color, having a volume-weight ratio of 3.4 to 3.8 was obtained. The properly proofed biscuits showed no separation of crust and center.

We claim:

1. Method of preparing baked raised products without yeast or $CO_2$ evolving materials which comprises incorporating with the dough ingredients in amounts sufficient to act as a leaven therefor, an oxygen evolving compound decomposable in the mixture, allowing the dough to stand until the $H_2O_2$ equivalent is less than 0.08% by weight of the dry flour used, and baking.

2. Method of preparing baked raised products without yeast or $CO_2$ evolving materials which comprises incorporating with the dough ingredients in amounts sufficient to act as a leaven therefor, a peroxygen compound decomposable in the dough mixture, allowing the mixed dough to stand until the $H_2O_2$ equivalent is less than 0.08% by weight of the dry flour used, and baking.

3. Method of preparing baked raised products without yeast or $CO_2$ evolving materials which comprises incorporating hydrogen peroxide with the dough ingredients in amounts sufficient to act as a leaven therefor, allowing the dough mixture to stand until the $H_2O_2$ content is less than 0.08% by weight of the dry flour used, and baking.

4. Method of preparing bread raised products without yeast or $CO_2$ evolving materials which comprises incorporating with the dough ingredients in amounts sufficient to act as a leaven therefor, an oxygen evolving compound decomposable in the mixture, allowing the dough to stand until the $H_2O_2$ equivalent is less than 0.08% by weight of the dry flour used, and baking within two hours thereafter.

5. Method of preparing baked raised products without yeast or $CO_2$ evolving materials which comprises incorporating with the dough ingredients in amounts sufficient to act as a leaven therefor, a peroxygen compound decomposable in the dough mixture, allowing the mixed dough to stand until the $H_2O_2$ equivalent is less than 0.08% by weight of the dry flour used, and baking within two hours thereafter.

6. Method of preparing baked raised products without yeast or $CO_2$ evolving materials which comprises incorporating hydrogen peroxide with the dough ingredients in amounts sufficient to act as a leaven therefor, allowing the dough mixture to stand until the $H_2O_2$ content is less than 0.08% by weight of the dry flour used, and baking within two hours thereafter.

7. Method of preparing baked raised products without yeast or $CO_2$ evolving materials which comprises incorporating with the dough ingredients, hydrogen peroxide equivalent to 0.5% to 2.0% of the weight of the dry flour used, allowing the dough mixture to stand until the $H_2O_2$ content is less than 0.08% by weight of the flour, and baking.

JOSEPH S. REICHERT.
WILLIAM J. SPARKS.